April 17, 1934.  R. G. MOORE  1,955,435
HOOD CATCH
Filed March 2, 1932
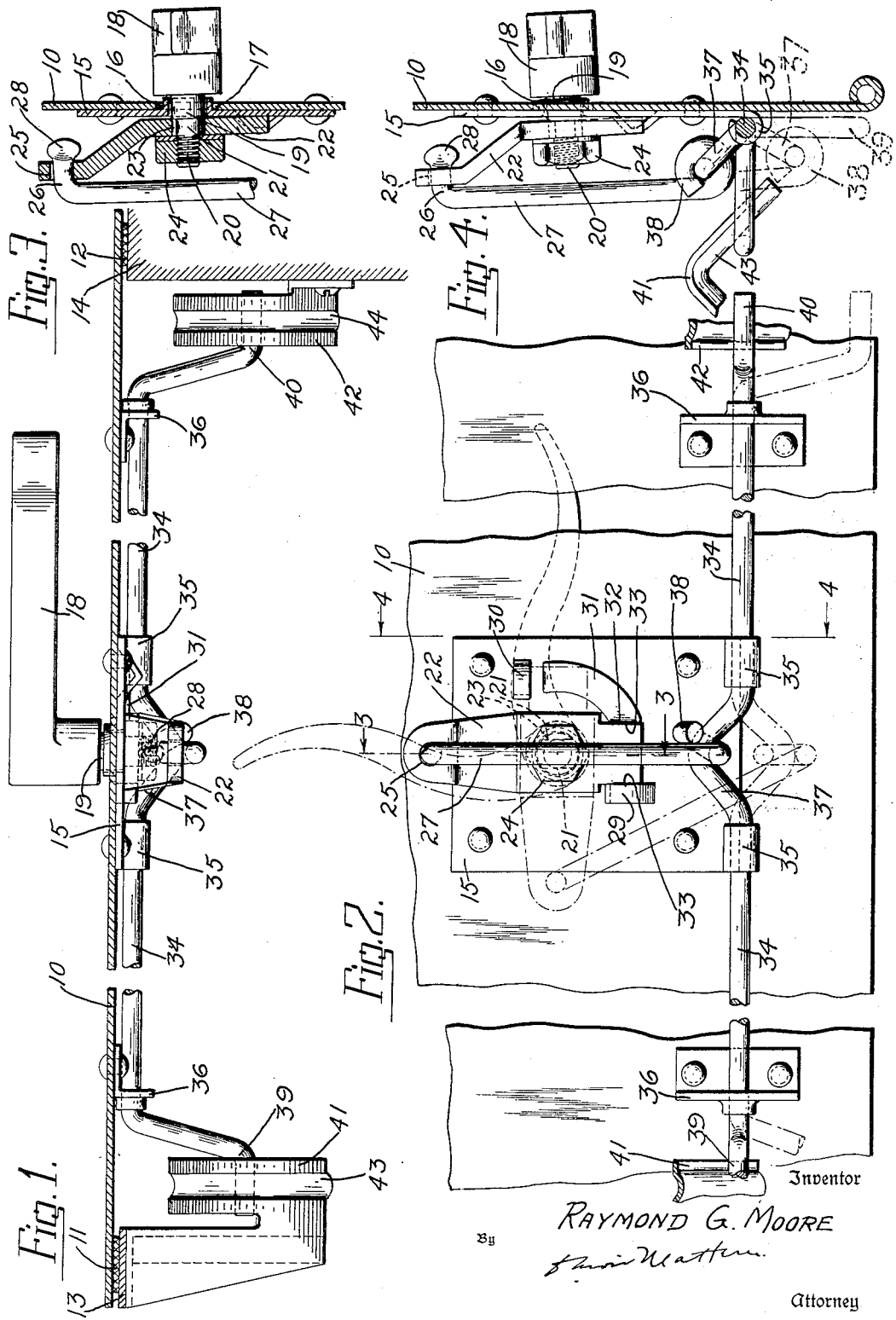
Inventor
RAYMOND G. MOORE
Attorney Patented Apr. 17, 1934

1,955,435

UNITED STATES PATENT OFFICE 1,955,435

HOOD CATCH

Raymond G. Moore, Bridgeport, Conn., assignor to The Bassick Company, Bridgeport, Conn., a corporation of Connecticut Application March 2, 1932, Serial No. 596,247

9 Claims. (Cl. 292—217)

The present invention relates to improvements in hood catches, particularly of the type in which rock-shaft means is provided interiorly of the hood for engagement near the ends of the hood with keeper brackets secured to the chassis, the rock-shaft means being actuated by an operating handle arranged exteriorly and at a central or intermediate point upon the hod. An object of the invention is to provide improved actuating means, which will be of simple construction, may be operated with facility and will be highly efficient and reliable in use, and to this end I propose, in the present exemplary embodiment of the invention, to provide a crank arm having its travel limited and controlled so that full advantage is taken of its most effective positions and leverages with respect to the load imposed thereon.

In most catches at present in use the locking is effected by swinging the crank arm past its high point or dead center, and in order to do this efficiently the crank arm should be carried approximately 10° over the center, and where the full travel of the crank arm is limited to 90°, to both swing the catch to operative position and lock it, this locking action takes up a large part of the effective movement of the crank arm. With the crank arm swinging 10° past the dead center it means that the catch parts after having been brought to their full movement at dead center recede 10° in locking, so that the 10° at the other side of the dead center is wasted, and 20° of the crank arm travel is thus used entirely for locking. During this 20° travel the catch is overtensioned beyond its normal holding tension and considerable extra effort is required to operate it. It also means that when the crank arm is in its open or inoperative position it only goes within 10° of the right angle line from its dead center, so that when swinging to operative position the 10° adjacent said right angle line, and which would represent the fastest travel, is not utilized.

In the unlocked part of the travel the crank arm simply moves the weight of the parts against little or no tension, and therefore the fastest part of the travel should be utilized during this action, while in the tensioning or locking part of the travel the resistance and strain is relatively great, so that the crank arm should be in its most favorable position to overcome such resistance. It is an object of the present invention to provide a catch in which this desirable condition is realized, permitting utilization of the full effective travel of the crank arm without waste motion, and which may be operated with very little effort and will be reliable and efficient in action. By utilizing the full effective travel a greater leverage is obtained and the parts may be made shorter and with less metal, and at the same time obtain the desired movement and tensioning of the catch means with less effort on the part of the operator.

Another object is to provide a catch structure in which the engagement of the link connection between the crank arm and rock shaft is such as to apply pressure in the plane of rotation of the rock shaft irrespective of the position of the link, and at the same time permit free swinging of the link with the crank arm. A further object is to provide detenting means for the crank arm, which will hold the crank arm against rattling and looseness in both the locked and unlocked positions, and which is free of parts which will readily get out of order.

With the above and other objects in view an embodiment of the invention is shown in the accompanying drawing, and this embodiment will be hereinafter more fully described with reference thereto, and the invention will be finally pointed out in the claims.

In the drawing:

Fig. 1 is a horizontal sectional view through the hood and frame and showing the catch in plan, the same being in its operative positon, and intermediate portions of the hood and rock shaft being broken away.

Fig. 2 is an interior elevation, also in operative position, and showing the inoperative position in dotted lines.

Fig. 3 is a vertical sectional view, taken along the line 3—3 of Fig. 2.

Fig. 4 is a vertical sectional view, taken along the line 4—4 of Fig. 2.

Similar reference characters indicate corresponding parts throughout the several figures of the drawing.

Referring to the drawing, the automobile hood 10 is adapted to close in the usual manner against the lacings 11 and 12 of the radiator frame 13 and cowl portion 14 of the chassis.

Upon the inner face of the hood, and preferably at a control point between the hood ends, there is riveted or otherwise suitably secured a bracket plate 15 having an outwardly flanged bearing aperture 16 in axial alignment with and having its flange engaged in a slightly larger aperture 17 in the hood.

The handle 18 is provided with a reduced diameter shank portion 19, which is engaged with said aperture 16 with a rotary and slightly loose fit, and has a reduced and threaded extension 20 at its inner end. Flats 21—21 are provided upon the shank adjacent the threaded extension 20, and a crank arm 22 is engaged upon this flattened portion of the shank, being provided with a non-circular opening 23 adapted to snugly fit thereon, and being secured by a nut 24. The slightly loose fit of the handle shank in its bearing permits a slight tilting of the crank arm for the purpose of detenting in the operative position, as will more fully appear.

The crank arm is bent outwardly from the bracket plate to provide an offset operating end and has an aperture 25 therein in which the right angularly bent end 26 of a connecting rod member 27 is loosely engaged and retained by pinching out the projected end of said portion, as at 28, this connecting rod being adapted as will hereinafter more fully appear to operate the rock shaft. It should be here pointed out that in the operative position the rock shaft is tensioned and exerts a downward pull on the connecting rod, drawing the crank arm into a tilted position with the offset end pulled away from the bracket and the other end pressed tightly against the bracket plate, and this action is utilized to detent the crank arm, and thus hold the parts in operative position, as will presently more fully appear.

The bracket plate 15 is provided with a pair of pressed out stop bosses 29 and 30, against which the end of the crank arm 22 abuts in its respective operative and inoperative position, being arranged so that the operating handle is limited to a definite swing of 90°, the upper limit of this swing being such that the arm is in a central vertical or dead center position and the lower limit being in a horizontal line at right angles thereto. An arcuate rib 31 is pressed up from the plate extending from a point contiguous to the boss 30 to a point spaced from the boss 29 to provide a detent pocket into which the end of the crank drops in the operative position under the pressure exerted by the tensioned rock-shaft.

The end of the rib is slightly beveled, as at 32, so that in releasing the crank arm to permit it to swing to inoperative position the end of the crank arm may be forced out of the detent pocket onto the rib surface. In this position the crank arm frictionally engages the rib surface under slight compression sufficient to retain the latch parts in operative position and against looseness and rattling. The detenting end of the crank arm is cut in at the sides as at 33—33 to provide a reduced width detenting portion.

The rock shaft 34, which extends longitudinally along the interior of the hood at each side of the bracket plate 15, is journaled in bearing brackets 35—35 bent from the lower edge of the bracket plate, and is also journaled near its outer ends in bearing brackets 36—36 secured interiorly upon the hood.

Between the bearing brackets 35—35 the rock shaft is angularly bent to substantially V-form to provide a crank portion 37, which is engaged by an eye 38 at the lower end of the connecting rod 27, in such manner that rotation of the crank arm 22 imparts rotational movement to the rockshaft. One portion of this eye 38 is a continuation of the rod in the same plane therewith while the other portion is angularly bent into offset relation, so that the points of contact with the rock shaft crank portion 37 apply pressure substantially in the central plane of rotation as the rockshaft is swung from inoperative to operative positions, and clearance is provided for swinging of the connecting rod without excessive looseness. In the operative position it will be seen that the pull of the connecting rod is in a straight line, and any tendency to distort such as obtains where the connecting rod is bent between its ends is eliminated.

The outer ends of the rock shaft are bent outwardly and longitudinally to provide offset crank ends 39 and 40, disposed parallel to the rock shaft, the offset of these crank portions being relatively greater than that of the crank portion 37 and also being angularly offset with respect to said portion 37. The crank portions 39 and 40 are adapted to engage angular keeper brackets 41 and 42 suitably mounted on the radiator and cowl, or upon any other convenient part of the chassis, in proximity to the hood ends. These brackets are illustrated as formed of sheet metal and their engaging faces, which are preferably disposed at an angle of about 45°, are respectively provided with pressed out rounded ribs 43 and 44 for engagement by the crank ends 39 and 40, providing positive and firm engagement, irrespective of variations in the mounting and disposition of the parts.

The rock-shaft is formed of a suitable spring metal, so that the crank ends 39 and 40 may be sprung to a different angular relation to the central crank portion 37 under the torsion and tensional effect of the rock-shaft. In the operative position, shown in full lines, with the crank ends 39 and 40 in engagement with the keeper brackets, this tension, as above pointed out, pulls downwardly upon the connecting rod 37 causing the crank arm to be pressed tightly against the plate 15 in the detent pocket between the boss 29 and the rib 30, thus holding the parts in operative position.

The operation is as follows:

Swinging of the handle 18 from the inoperative to the operative position rotates the crank arm 22 and through the connecting rod member 27 rotates the rock shaft 34, first bringing the crank ends 39 and 40 under and into engagement with the keeper brackets 41 and 42, whereupon they are sprung under tension as the movement of the handle is completed, the crank arm being retained in its operative position by dropping into the detent pocket adjacent the stop boss 29. It will be observed that in this position the crank arm is at its high point, so that the full effective swing is utilized for moving, tensioning, and locking the rock-shaft, the fast travel portion being utilized for moving the parts into keeper engaging position and the slow travel portion, from which the greatest pressure is obtained, being utilized for tensioning and locking. To disengage the latch the handle is moved to force the crank arm out of the detent pocket, the crank arm being swung to the horizontal position against the stop boss 30 where it is frictionally retained by wedging contact with the rib 31. The latch portions are thus held against looseness and rattling.

I have illustrated and described a preferred and satisfactory embodiment of my invention, but it will be obvious that changes may be made therein, within the spirit and scope thereof, as defined in the appended claims.

Having thus described my invention, what I claim and desire to secure by Letters Patent is:—

1. A hood catch actuator, for operating keeper engaging catch means, comprising manually operable rotatable actuating means operatively connected to said catch means, the point of connection being movable in an arc and in a substantially vertical plane, means adapted to limit the movement of said actuating means in its operative position to its highest point of travel whereby there is no regressive movement during said movement to operative position, and means adapted to releasably retain said actuating means in said operative position.

2. A hood catch actuator, for operating keeper engaging catch means, comprising manually operable actuating crank means, a connecting link member between said crank means and said catch means, means adapted to limit the movement of said actuating means in its operative position to its highest point of travel, and means adapted to releasably retain said actuating means in said operative position, the axis of said crank means and the connections of said link member with said crank means and catch means being in the same plane in the operative position and said connecting link member extending in a straight line between said connections.

3. A hood catch actuator, for operating keeper engaging catch means, comprising manually operable actuating crank means, a connecting link member between said crank means and said catch means, the end of said link member connected to said catch means being in the form of an eye, the portion of said eye between its point of engagement with said catch means and the body of said link being in alignment with the body of said link and its end portion being bent out of alignment therewith.

4. A hood catch actuator for operating keeper engaging catch means, comprising manually operable rotatable actuating crank means adapted to have movement in addition to its rotary movement and operatively connected to said catch means, and retaining means for said crank means rendered effective to retain and release said crank means through said additional movement.

5. A hood catch actuator, for operating keeper engaging catch means, comprising manually operable rotatable actuating crank means adapted to have tilting movement about an axis transverse to its axis of rotation, and operatively connected to said catch means, and retaining means for said crank means rendered effective to retain and release said crank means through said tilting movement.

6. A hood catch actuator for operating keeper engaging catch means, comprising manually operable rotatable actuating crank means adapted to have movement in addition to its rotary movement, and operatively connected to said catch means, recessed means adapted to be engaged by said crank means in one position and raised means adapted to be engaged by said crank means in another position, said crank means adapted to move to and from said recessed and raised means through said additional movement.

7. A hood catch actuator, for operating keeper engaging catch means, comprising manually operable rotatable actuating crank means adapted to have tilting movement about an axis transverse to its axis of rotation, and operatively connected to said catch means, recessed means adapted to be engaged by said crank means in one position and raised means adapted to be engaged by said crank means in another position, said crank means adapted to move to and from said recessed and raised means through said tilting movement.

8. A hood catch actuator, for operating keeper engaging catch means, comprising manually operable rotatable actuating crank means adapted to have movement in addition to its rotary movement, and operatively connected to said catch means, recessed means adapted to be engaged by said crank means in one position and raised means adapted to be engaged by said crank means in another position, said crank means adapted to move to and from said recessed and raised means through said additional movement, said crank means being frictionally engaged with said raised means by wedging engagement therewith.

9. A hood catch actuator for operating keeper engaging catch means, said catch means engaging the keeper under tension, comprising manually operable rotatable actuating crank means adapted to have movement in addition to its rotary movement, and operatively connected to said catch means, recessed means adapted to be engaged by said crank means in one position and raised means adapted to be engaged by said crank means in another position, said crank means adapted to move to and from said recessed and raised means through said additional movement and being releasably retained in engagement with said recessed means under said tension.

RAYMOND G. MOORE.